W. B. TRACY.
Rod-Clamping Device for Walking-Beams of Oil-Pumps.

No. 207,999. Patented Sept. 10, 1878.

Witnesses:
James J. Sheehy
Jno. T. Blackman

Inventor:
Wayne B. Tracy
Gilmore, Smith & Co.
Attorneys.

UNITED STATES PATENT OFFICE.

WAYNE B. TRACY, OF PHILADELPHIA, PENNSYLVANIA.

IMPROVEMENT IN ROD-CLAMPING DEVICES FOR WALKING-BEAMS OF OIL-PUMPS.

Specification forming part of Letters Patent No. 207,999, dated September 10, 1878; application filed March 30, 1878.

*To all whom it may concern:*

Be it known that I, WAYNE B. TRACY, of Philadelphia, in the county of Philadelphia and State of Pennsylvania, have invented a new and valuable Improvement in Oil-Well Pumps; and I do hereby declare that the following is a full, clear, and exact description of the construction and operation of the same, reference being had to the annexed drawing, making a part of this specification, and to the letters and figures of reference marked thereon.

Figure 1:
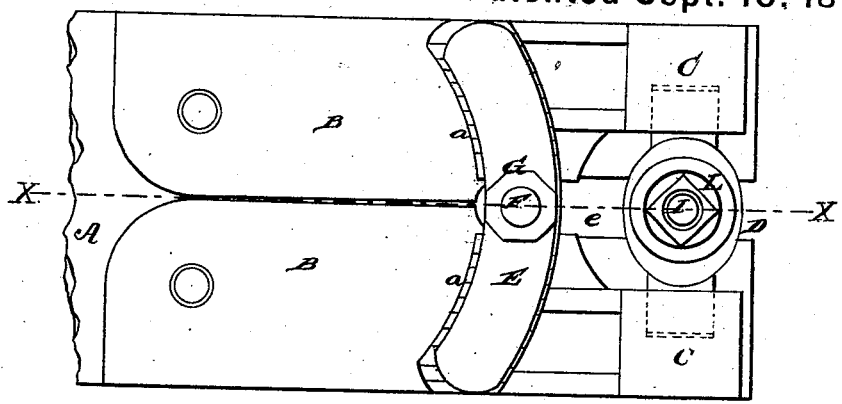
Figure 2:
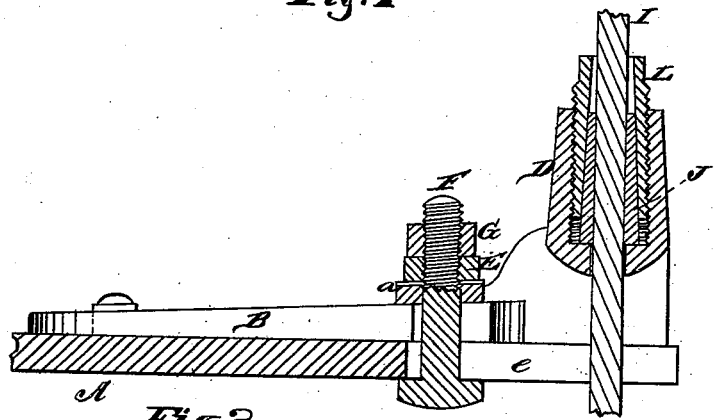
Figure 3:
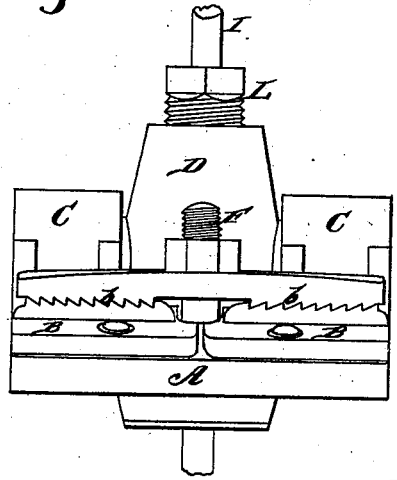

Figure 1 of the drawing is a representation of a plan view of my oil-well pump. Fig. 2 is a vertical sectional view, and Fig. 3 is an end view, thereof.

The nature of my invention consists in the construction and arrangement of a rod-clamping device and adjustable jaws for use on the walking-beam of an oil-pumping engine, as will be hereinafter more fully set forth.

The annexed drawing, to which reference is made, fully illustrates my invention.

A represents the end of a walking-beam for an oil-pumping engine, on top of which are pivoted two plates, B B, formed at their outer ends with the jaws C C to receive the T-head D. The jaws C C are held together in place by the following means: On the upper surfaces of the two plates B B are made series of teeth $a$ $a$, preferably in the curved form shown. Into these teeth take corresponding teeth $b$, formed on the under side of a clamping-bar, E. The end of the walking-beam is formed with a longitudinal slot, $e$, and in the inner end thereof is placed a T-bolt, F, which passes upward through notches in the inner edges of the two plates and through a hole in the bar E. A nut, G, is then screwed down on the nut F to hold the bar E firmly on the plate, with the teeth engaging with each other, and the jaws are thereby held in position.

By simply loosening the nut G the head D is loosened, and still the jaws C C remain fastened to the beam.

The body of the head is hollow, with interior screw-threads, and a hole in the bottom for the passage of the rod I. Around this rod in the head is placed a longitudinally-bisected tapering packing, J, and a hollow screw-plug, L, having its interior bore correspondingly tapering, is screwed into the head D around the packing J, to make said packing clamp and firmly hold the rod I in position in the head.

The clamp-packing J may have flutes, corrugations, or teeth crosswise on the inside to take a firmer gripe on the rod.

What I claim as new, and desire to secure by Letters Patent, is—

1. In combination with the walking-beam A and head, the plates B B, with jaws C C and teeth $a$, the toothed bar E, T-bolt F, and nut G, all constructed substantially as and for the purposes set forth.

2. The combination of the head D, having interior screw-threads, the rod I, tapering bisected clamp J, and hollow screw-plug L, all substantially as and for the purposes set forth.

In testimony that I claim the above I have hereunto subscribed my name in the presence of two witnesses.

WAYNE B. TRACY.

Witnesses:
HUGH WALLACE,
H. J. SWARTZBERGER.